April 4, 1944. H. H. WAGNER 2,345,779
COMMINUTING METHOD
Filed May 6, 1939 3 Sheets-Sheet 1

Inventor:
Harold H. Wagner.
By McConkey Dawson & Booth
Attys.

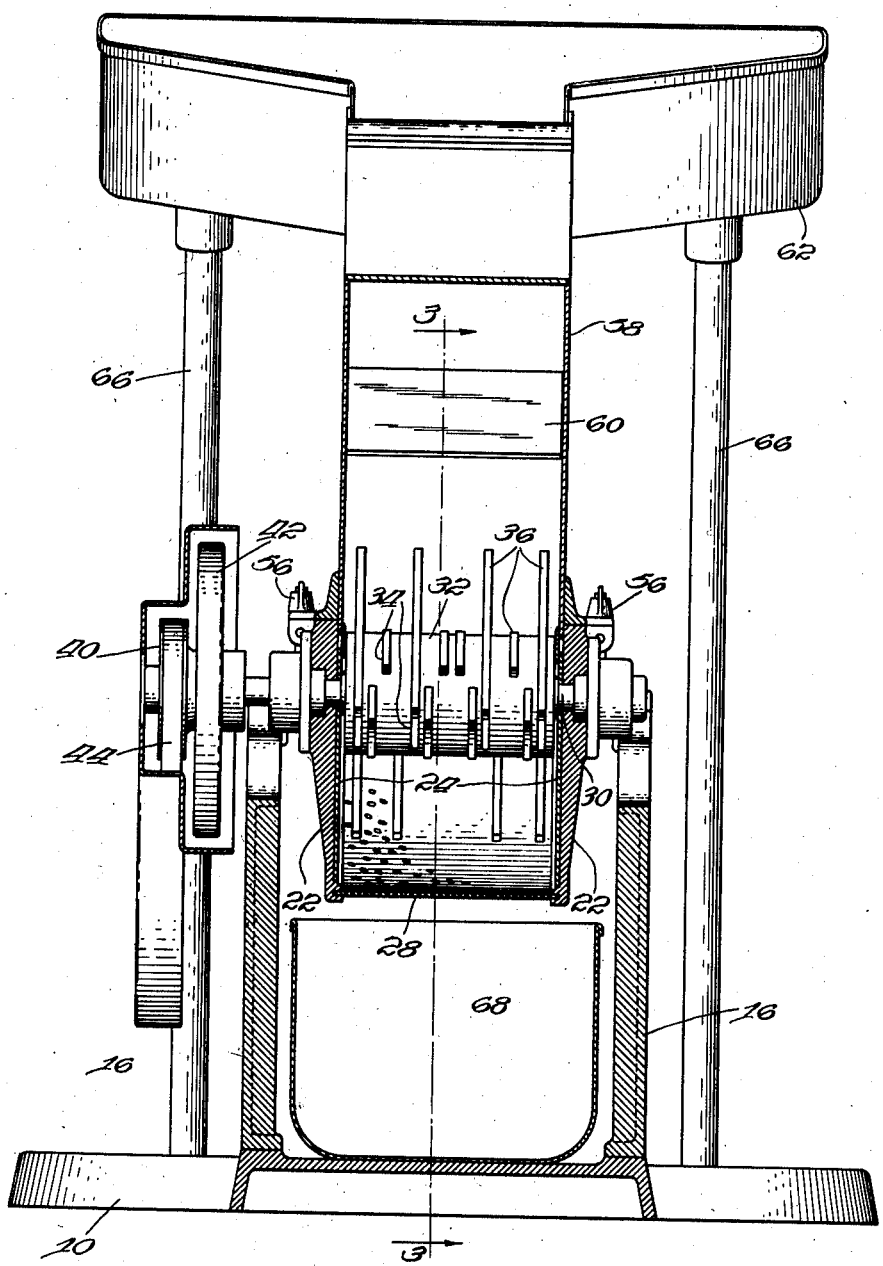

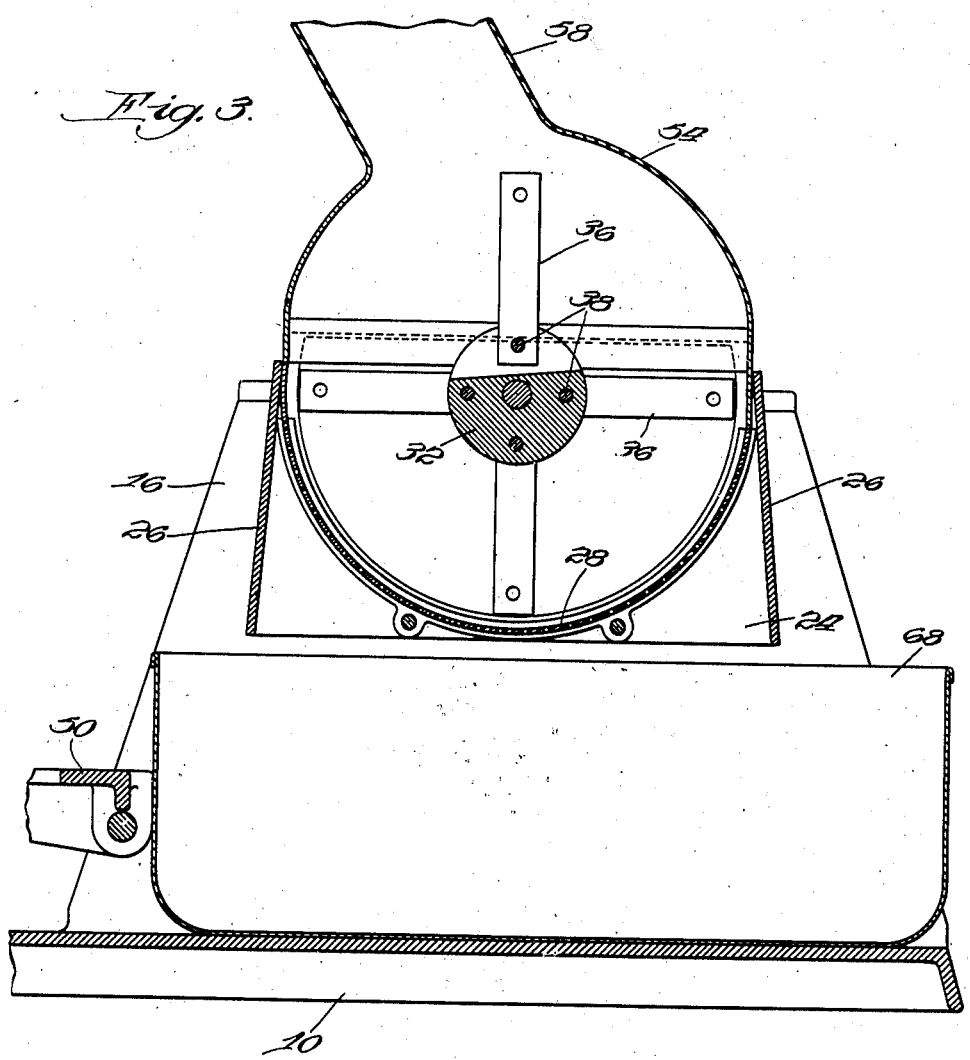

Patented Apr. 4, 1944

2,345,779

UNITED STATES PATENT OFFICE 2,345,779

COMMINUTING METHOD

Harold H. Wagner, Cincinnati, Ohio, assignor to The Albert Kircher Company, Chicago, Ill., a corporation of Delaware Application May 6, 1939, Serial No. 272,208

2 Claims. (Cl. 146—219)

This invention relates to comminuting method and more particularly to comminuting food products for use in bakery goods.

One of the objects of the invention is to provide a method of comminuting food products to convert them into a finely divided form.

Another object of the invention is to provide a method for preparing whole fresh vegetables, fruit and the like for incorporation into bakery products.

Still another object of the invention is to provide a method for finely dividing and simultaneously whipping air into food products.

Other objects, advantages and novel features of the invention including various uses thereof will be apparent from the following description when read in connection with the accompanying drawings, in which:

Figure 2 is a section on the line 2—2 of Figure 1; and

Figure 3 is a partial section on the line 3—3 of Figure 2.

Figure 1:
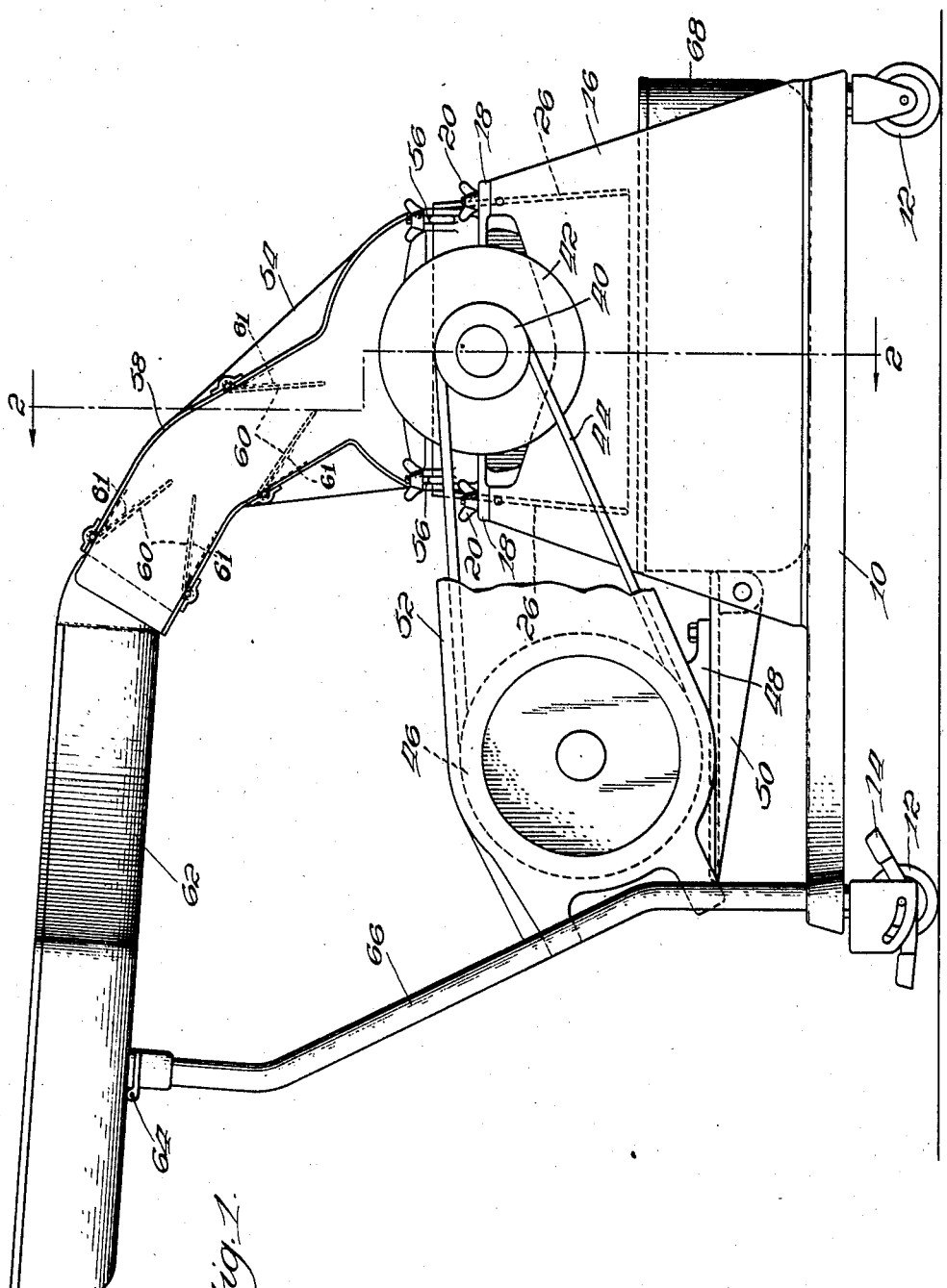
Figure 1 is a side view of a machine embodying the invention with parts in section.

According to the present invention food products of various types are subjected to a rapid series of high speed impacts which serve to break the products up into a finely divided form and simultaneously to whip air into them. The products may then be forced through a screen or the like having calibrated openings whose size serves to limit the maximum size of the particles delivered by the machine. I have found that the speed of impact is highly important and that different speeds have different effects on the products. This may be due to variations in the amount of air whipped into the product or possibly to some other cause, the reasons for which I am at present unable to explain.

The illustrated machine comprises a base 10 mounted on casters 12 and having brake means 14 for holding it in any desired position. Side frame members 16 are secured to opposite sides of the base at one end and support a lower housing part through lugs 18 and nuts or the like 20. The lower housing part is formed by side castings 22 lined with stainless steel sheets 24 and secured together by end plates 26, the bottom of the housing being left open. The side plates 22 are formed with arcuate grooves slidably to receive a curved screen or perforated plate 28, the screens or plates 28 being readily interchangeable to provide different sized perforations as desired.

The side plates 22 rotatably support the ends of a shaft 30 to which is secured a cylindrical block 32 formed with series of spaced grooves 34, the block 32 preferably being of solid metal for ease of cleaning. Each of the grooves 34 receives one end of a hammer member 36 in the form of an elongated bar. Pins 38 extend axially through the block 32 and pivotally secure the bars 36 in place. The bars are of such a length as to clear the screen 28 relatively closely.

The shaft 30 and block 32 are driven through a pulley 40 and preferably carry a fly wheel 42 to keep the speed more uniform. A belt 44 fits over the pulley 40 and over the pulley 46 connected to the shaft of a suitable driving motor 48. As shown, the driving motor is mounted on a plate 50 which is pivotally secured to the frame members 16 so that the weight of the motor tends to keep the belt tight. A guard 52 enclosing the belt and pulleys is preferably provided.

The lower housing part is closed by an upper housing 54 mounted on the lower housing by pivoted wing bolts 56 and formed with an upwardly extending trough portion 58. Two sets of pivotally mounted gates 60 are provided in the trough portion 58 opening downwardly under the weight of material to be treated and yieldingly urged toward closed position by suitable springs 61. The gates 60 prevent any material from being thrown back through the chute.

Material is fed to the chute through an open trough or hopper 62 pivotally mounted at 64 on upstanding arms 66 secured at their lower ends to the base 10. The hopper 62 is formed with a discharge portion fitting into the end of the chute 58 and preferably slopes downward toward the chute so that material will be fed by gravity.

A suitable pan or receptacle 68 is arranged below the lower housing in alignment with the open lower end thereof to receive the treated material and may be slid forwardly between the frame members 16 to be emptied when desired.

In using the machine, the material is placed in the hopper 62 and feeds downwardly by gravity through the chute 58 and past the gates 60 into the housing portion. The material is then struck at a high rate of speed by the hammer members 36 and is broken up into fine particles which pass through the screen 28 into the receptacle 68.

The machine is particularly adapted for use to make the product more fully described and claimed in my copending application No. 272,207, filed May 6, 1939, for use in baking bread and the like in the manner fully disclosed in said copending application. I have found that the speed of operation of the machine is highly important and that products having different characteristics are produced when the machine is operated at different speeds. Satisfactory results may be produced when the shaft 30 is driven at speeds in excess of four thousand R. P. M. and I prefer to utilize a speed of five thousand R. P. M. at which maximum results are obtained. With hammer members 4½ inches long pivoted ½ inch from the end and with the pivot point 1⅞ inches from the axis of shaft 30, the hammer members will have a tip velocity of about 226 feet per second and a velocity at the mid point of about 140 feet per second and a velocity at the hub of about 52 feet per second at five thousand R. P. M., and at four thousand R. P. M. will have a tip velocity of about 180 feet per second and a velocity in the mid point of about 112 feet per second an a velocity at the hub of about 41 feet per second.

Potatoes treated in the machine operating at this speed provide a liquid mass containing finely divided solid particles which has a very smooth feel. If the machine is operated above four thousand R. P. M., I have found that the starch separates rapidly from the potato material by gravity, while at speeds less than four thousand R. P. M. the separation does not occur to as great an extent. Also potato material treated at the higher speeds is more compatible with a bread dough and produces a loaf of bread of finer texture and flavor than that produced at the lower speeds. These effects are believed to be due at least in part to incorporation of a greater amount of air into the material during treatment at the higher speeds although certain other effects may be present.

Due to the fact that the potato starch separates so rapidly from potatoes treated according to the present invention and since the present machine is of relatively small size and weight while having a high capacity, it might be desirable for the production of potato starch to take potatoes directly from the field and run them through the machine of the present invention. By then treating the resultant production with a centrifugal separator or the like, the potato starch could be removed quickly and easily.

In addition to treating potatoes, the present invention contemplates the treatment of various other types of vegetables and food products. For example, any desired vegetable, either dry or moist can be treated to form a finely divided material suitable for various uses. In addition to incorporating such material into bakery products, it can be used for the making of vegetable purees and the like.

Fruits may also be treated to form a fruit product suitable for flavoring bakery goods or the like and for this purpose the whole fruit is run through the machine. For example, oranges may be treated without removing the skin or the seeds and the resultant product is an orange material desirable for flavoring orange cakes or the like.

Whole cereal grains may likewise be treated for the production of whole cereal bread as described in the copending application referred to above. Treatment of the grains in the present machine provides a very light meal containing a large quantity of air and which mixes readily to form a dough. Similar products used for flavoring or the like such as caraway seeds, celery seeds, etc., may likewise be ground in the machine to provide a flavoring material for bakery products.

The machine is also well adapted for forming cake mixes and the like in which flour, sugar and other ingredients are mixed together. It has been found that an intimate mixture of these materials is made by running them through the machine and that no sieving is necessary. In this connection the machine presents a particular advantage in that it is possible to utilize ordinary granulated sugar, the action of the machine breaking the sugar up into particles at least as fine as those of ordinary confectioners' sugar with the additional advantage that no starch need be present. Various other materials not specifically mentioned above either in dry or wet form may advantageously be treated in the machine. In all cases, a very fine division of the material is effected and a substantial quantity of air is whipped into the material so that it will have a lighter texture and may be mixed more readily into a dough or the like.

What is claimed is:

1. A process for comminuting whole fresh vegetables to convert the same into a substantially uniform mass of finely divided particles, comprising introducing the vegetable material into a comminuting zone, rapidly rotating a plurality of bar hammer members throughout substantially the entire zone to subject the material within the zone to a rapid series of high speed impacts throughout the cycle of movement of the members and throughout the area traversed by the members, the bar hammer members having a tip velocity in excess of 180 feet per second and a base velocity in excess of 41 feet per second, closely confining the material about the periphery of said zone to restrain the material against centrifugal movement from the zone while continuing the impacting operation until the material is reduced to a substantially uniform mass of finely divided particles and during the impacting operation simultaneously discharging from a portion of the zone adjacent the periphery thereof and through a relatively finely perforated wall a substantially uniform mass of very finely divided vegetable particles smaller than the predetermined size of the perforations in said wall.

2. A process for comminuting berries, fruits and the like containing seeds to convert the entire mass, including the pulp and the seeds, into a substantially uniform mass of very finely divided particles, comprising introducing the material containing the seeds into a comminuting zone, rapidly rotating a plurality of bar hammer members throughout substantially the entire zone to subject the material within the zone to a rapid series of high speed impacts throughout the cycle of movement of the members and throughout the area traversed by the members, the bar hammer members having a tip velocity in excess of 180 feet per second and a base velocity in excess of 41 feet per second, the intervals between impacts being so short that the material is loosely suspended in the air of said zone, closely confining the material about the periphery of said zone to restrain the material against centrifugal movement from the zone while continuing the impacting operation until the material, including the pulp and the seeds, is reduced to a substantially uniform mass of finely divided particles, and during the impacting operation discharging from a portion of the zone adjacent the periphery thereof a substantially uniform mass of very finely divided particles smaller than a predetermined size while restraining against discharge particles larger than said predetermined size.

HAROLD H. WAGNER.